(12) United States Patent
Prathipati et al.

(10) Patent No.: US 12,371,166 B2
(45) Date of Patent: Jul. 29, 2025

(54) DEPLOYABLE SLEEP SUPPORT SYSTEM FOR SEATED PASSENGERS

(71) Applicant: B/E Aerospace, Inc., Winston-Salem, NC (US)

(72) Inventors: Krishna Chaitanya Prathipati, Hyderabad (IN); Ravindra Ramulu Kandukuri, Secunderabad (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 213 days.

(21) Appl. No.: 18/139,026

(22) Filed: Apr. 25, 2023

(65) Prior Publication Data

US 2024/0043124 A1    Feb. 8, 2024

(30) Foreign Application Priority Data

Aug. 8, 2022    (IN) .............................. 202241045296

(51) Int. Cl.
 *B64D 11/06*    (2006.01)
(52) U.S. Cl.
 CPC ................................ *B64D 11/0642* (2014.12)
(58) Field of Classification Search
 CPC ... B64D 11/0638; B64D 11/0642; A47C 7/70; B60N 3/004
 USPC ........................................................ 297/146
 See application file for complete search history.

(56) References Cited

U.S. PATENT DOCUMENTS

| | | | | |
|---|---|---|---|---|
| 126,009 A | * | 4/1872 | Beidler ............... | B64D 11/0638 297/146 |
| 2,619,395 A | * | 11/1952 | Kent ...................... | B60N 3/004 297/146 |
| 3,049,374 A | * | 8/1962 | Nance .................... | B60N 3/004 297/146 |
| 3,374,032 A | * | 3/1968 | Del Giudice ...... | B64D 11/0642 297/394 |
| 3,544,161 A | | 12/1970 | Bryden | |
| 4,159,071 A | * | 6/1979 | Roca ........................ | A47C 7/70 108/42 |
| 4,511,178 A | * | 4/1985 | Brennan ............ | B64D 11/0638 297/440.1 |

(Continued)

FOREIGN PATENT DOCUMENTS

| | | |
|---|---|---|
| CN | 201832068 U | 5/2011 |
| DE | 10213644 A1 | 10/2003 |

(Continued)

OTHER PUBLICATIONS

FaceCradle Adjustable Travel Pillow, https://www.amazon.com/dp/B06XKZ4NXT?tag=buzz0f-20&ascsubtag=4583585%2C11%2C19%2Cd%2C0%2C0%2Cgoogle%2C776%3A1%3B962%3A1%3B901%3A2%3B900%3A2%3B974%3A3%3B994%3A3%3B1101%3A1%3B1115%3A2%2C518666%2C0%2C0.

(Continued)

*Primary Examiner* — Jose V Chen
(74) *Attorney, Agent, or Firm* — Suiter Swantz IP

(57) ABSTRACT

A passenger seat including a sleep support system attached to a backrest of the seat and including first and second support arms pivotally attached to respective first and second sides of the backrest configured to deploy forward. A pillow assembly attaches to the deployed first and second support arms and a tubular cover is positioned surrounding at least a portion of the pillow assembly. In use, a seated passenger deploys the arms forward, attaches the covered pillow assembly, and leans forward against the pillow to assume a comfortable sleeping position.

15 Claims, 8 Drawing Sheets

(56) References Cited

U.S. PATENT DOCUMENTS

| | | | | |
|---|---|---|---|---|
| 4,792,183 A * | 12/1988 | Townsend, III | ....... | B60N 3/004 |
| | | | | 297/169 |
| 5,010,668 A * | 4/1991 | Zeligson | ................ | B60N 3/002 |
| | | | | 40/320 |
| 6,619,733 B2 | 9/2003 | Pearson | | |
| 7,004,430 B2 * | 2/2006 | Weekly | ................... | B60N 3/004 |
| | | | | 16/248 |
| 8,528,970 B2 * | 9/2013 | Edalati | ................. | A47C 20/026 |
| | | | | 297/394 |
| 8,528,978 B2 | 9/2013 | Purpura et al. | | |
| 8,985,693 B2 | 3/2015 | Purpura et al. | | |
| 9,930,977 B1 | 4/2018 | Jennings | | |
| 10,449,882 B2 | 10/2019 | Lev | | |
| 10,696,410 B2 * | 6/2020 | Wilcynski | .......... | B64D 11/0642 |
| 11,213,144 B2 | 1/2022 | Eid | | |
| 2003/0184957 A1 * | 10/2003 | Stahl | ...................... | B64D 11/06 |
| | | | | 361/679.1 |
| 2003/0193220 A1 * | 10/2003 | Jensen | ............... | B64D 11/0638 |
| | | | | 297/146 |
| 2009/0121523 A1 * | 5/2009 | Johnson | ............. | B64D 11/0638 |
| | | | | 297/217.3 |
| 2009/0174234 A1 * | 7/2009 | Vignal | ................... | B60N 3/002 |
| | | | | 108/44 |
| 2009/0188881 A1 * | 7/2009 | Travis | ....................... | B62B 9/26 |
| | | | | 211/132.1 |
| 2011/0011979 A1 * | 1/2011 | Weil | ................... | B64D 11/0638 |
| | | | | 297/135 |
| 2013/0232696 A1 | 9/2013 | Halimi et al. | | |
| 2017/0096224 A1 | 4/2017 | Marom | | |
| 2017/0291710 A1 * | 10/2017 | Barr-Perea | ......... | B61D 33/0007 |
| 2018/0022250 A1 * | 1/2018 | Lev | ........................ | B60N 2/838 |
| | | | | 297/399 |
| 2020/0016018 A1 | 1/2020 | Du | | |
| 2020/0172250 A1 * | 6/2020 | Drenzeck | ........... | B64D 11/0636 |
| 2022/0081117 A1 * | 3/2022 | Alam | ................. | B64D 11/0642 |
| 2022/0185481 A1 | 6/2022 | Hongthong | | |
| 2023/0120497 A1 * | 4/2023 | Shivalinga | ............... | B64D 9/00 |
| | | | | 244/118.1 |
| 2023/0227162 A1 * | 7/2023 | Satterfield | .......... | B64D 11/0638 |
| | | | | 108/44 |
| 2024/0262504 A1 * | 8/2024 | Lalli | .................... | B60N 2/4221 |

FOREIGN PATENT DOCUMENTS

| | | | |
|---|---|---|---|
| EP | 2589535 A1 | 5/2013 | |
| EP | 3035825 B1 | 9/2017 | |
| FR | 2836099 B1 | 8/2004 | |
| WO | WO-2017176722 A1 * | 10/2017 | ......... B64D 11/0638 |

OTHER PUBLICATIONS

Extended European Search Report dated Dec. 5, 2023; European Application No. 23189703.4.

* cited by examiner

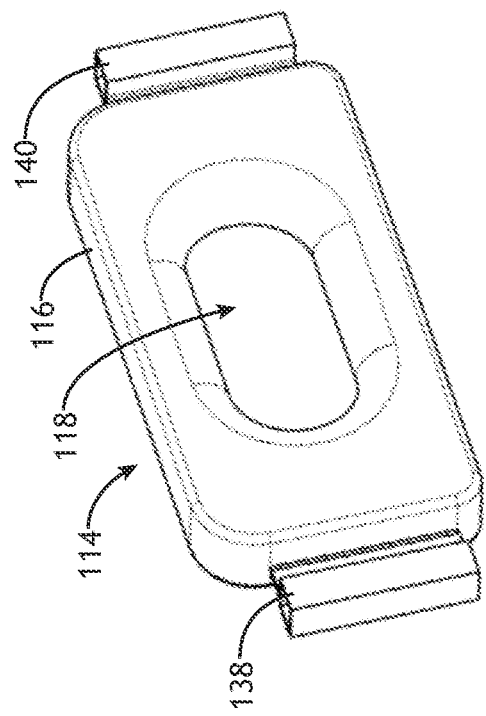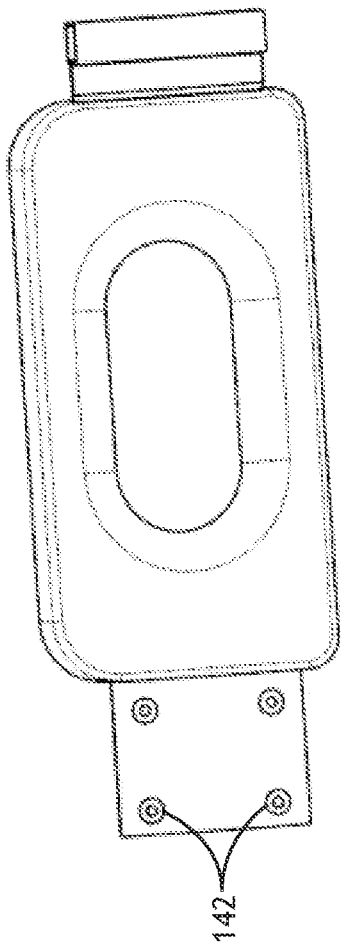

DEPLOYABLE SLEEP SUPPORT SYSTEM FOR SEATED PASSENGERS

CROSS-REFERENCE TO RELATED APPLICATION

This nonprovisional application claims the benefit of priority of Indian provisional application number 202241045296 filed Aug. 8, 2022 for "DEPLOYABLE SLEEP SUPPORT SYSTEM FOR SEATED PASSENGERS," which is hereby incorporated by reference in its entirety.

TECHNICAL FIELD AND BACKGROUND

The present disclosure relates generally to integrated sleeping provisions for passenger seats, and more particularly to a sleep support system attached to or attachable to a backrest including a forward deployable support frame, a pillow assembly attachable to the forward deployed support frame, and a sanitary cover.

Some passenger seats include provisions for sleeping. For example, aircraft passenger seats may include mechanisms for achieving a reclined sitting position during flight while other seats may include mechanisms for adjusting a portion of the headrest forward. In either case, the sleeping provision requires the seated passenger to remain with their back against the backrest.

During long journeys such as long-haul flights, over time seated passengers may become uncomfortable and restless. Restless passengers may seek to change their sitting position. In the case of window seats, seated passengers may lean against the fuselage to sleep. In the case of economy class row seats, seated passengers may lean forward onto their deployed tray table to sleep. Neither sleeping solution is ideal considering the fuselage wall is subject to constant movement caused by turbulence, and the deployed tray table requires the seated passenger to lean forward well beyond a comfortable body angle. In addition, the seat pitch in economy class row seats does not allow the seated passenger to fold over completely, and the fuselage wall and the deployed tray table are hard rigid surfaces.

Therefore, what is needed is an integrated provision for sleeping which places the seated passenger in an ergonomic position, relieves pressure on the back, and which does not require the passenger to carry aboard their own dedicated sleeping device.

BRIEF SUMMARY

Broadly speaking, the present disclosure is directed to integrated sleeping provisions for passenger seats such as aircraft passenger seats.

To achieve the foregoing and other advantages, the inventive aspects disclosed herein are directed to an aircraft passenger seat including a backrest and a sleep support system attached to the backrest. The sleep support system includes a support frame generally including a first support arm pivotally attached to a first side of the backrest, the first support arm having a detached end configured to be lowered to deploy the first support arm in a forward direction, and a second support arm pivotally attached to a second side of the backrest, the second support arm having a detached end configured to be lowered to deploy the second support arm in a forward direction. A pillow assembly attaches to the first and second support arms when deployed forward and includes a pillow having a center opening, a first sleeve attached to a first side of the pillow and configured to receive the first support arm, and a second sleeve attached to a second side of the pillow and configured to receive the second support arm. A tubular cover finishes the system by being positioned over the pillow.

In some embodiments, each of the first support arm and the second support arm is constructed from telescoping members.

In some embodiments, the first support arm carries a first spring-loaded push button and the first side of the backrest carries a first spring-loaded pin and the second support arm carries a second spring-loaded push button and the second side of the backrest carries a second spring-loaded pin. In a stowed condition of the first support arm, the first spring-loaded pin is received in the first support arm axially aligned with the first spring-loaded push button, and in a stowed condition of the second support arm, the second spring-loaded pin is received in the second support arm axially aligned with the second spring-loaded push button. In use, the first spring-loaded push button is configured to be depressed to force the first spring-loaded pin to withdraw from the first support arm to deploy the first support arm forward, and the second spring-loaded push button is configured to be depressed to force the second spring-loaded pin to withdraw from the second support arm to deploy the second support arm forward.

In some embodiments, the first support arm defines a first ramped surface configured to drive the first spring-loaded pin in a direction of the backrest upon engagement of the first ramped surface with the first spring-loaded pin, and the second support arm defines a second ramped surface configured to drive the second spring-loaded pin in a direction of the backrest upon engagement of the second ramped surface with the second spring-loaded pin.

In some embodiments, the system further includes a first stop pin carried on the first side of the backrest configured to interact with the first support arm to prevent over travel of the first support arm in the forward direction, and a second stop pin carried on the second side of the backrest configured to interact with the second support arm to prevent over travel of the second support arm in the forward direction.

In some embodiments, the first side of the backrest is curved and the first support arm is curved toward the backrest, and wherein the second side of the backrest is curved and the second support arm is curved toward the backrest.

In some embodiments, the first sleeve is openable to be wrapped around the first support arm and includes fasteners for maintaining the first sleeve in a closed condition, the second sleeve is openable to be wrapped around the second support arm and includes fasteners for maintaining the second sleeve in a closed condition, and the pillow is elongate and the center opening is elongate.

In some embodiments, the first support arm is movable between a stowed condition alongside the first side of the backrest and a deployed condition forward of the backrest, and wherein an angle formed between the stowed condition and the deployed condition of the first support arm is no more than 45 degrees, and the second support arm is movable, independent of the first support arm, between a stowed condition alongside the second side of the backrest and a deployed condition forward of the backrest, and wherein an angle formed between the stowed condition and the deployed condition of the second support arm is no more than 45 degrees.

Inventive aspects of the present disclosure are further directed to a sleep support system attachable to a passenger seat backrest. The system includes a first support arm pivotally attachable to a first side of the backrest, the first support arm having a detached end configured to be lowered to deploy the first support arm in a forward direction relative to the backrest, a first retainer attachable to the first side of the backrest configured to retain the first support arm in a stowed condition, a second support arm pivotally attachable to a second side of the backrest, the second support arm having a detached end configured to be lowered to deploy the second support arm in a forward direction relative to the backrest, and a second retainer attachable to the second side of the backrest configured to retain the second support arm in a stowed condition.

A pillow assembly is attachable to the first and second support arms when the first and second support arms are deployed forward, the pillow assembly including a pillow having a center opening, a first sleeve attached to a first side of the pillow and configured to receive the first support arm, and a second sleeve attached to a second side of the pillow and configured to receive the second support arm. A tubular cover can be positioned to cover the pillow, for example, surrounding at least a portion of the pillow and covering the center opening.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings:

FIGS. 10A and 10B are front isometric views of the pillow assembly; and

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Broadly speaking, the present disclosure provides embodiments of passenger seats equipped with an integrated sleep support system and a sleep support system configured to be installed on a passenger seat. In some implementations the passenger seat is an aircraft passenger seat such as a premium seat or an economy class seat of a seat row. In use, the sleep support system is stowed during taxi, takeoff and landing (TTOL) and may be deployed during flight. In some embodiments, a sanitary cover is replaced between uses of the sleep support system.

Figure 1:
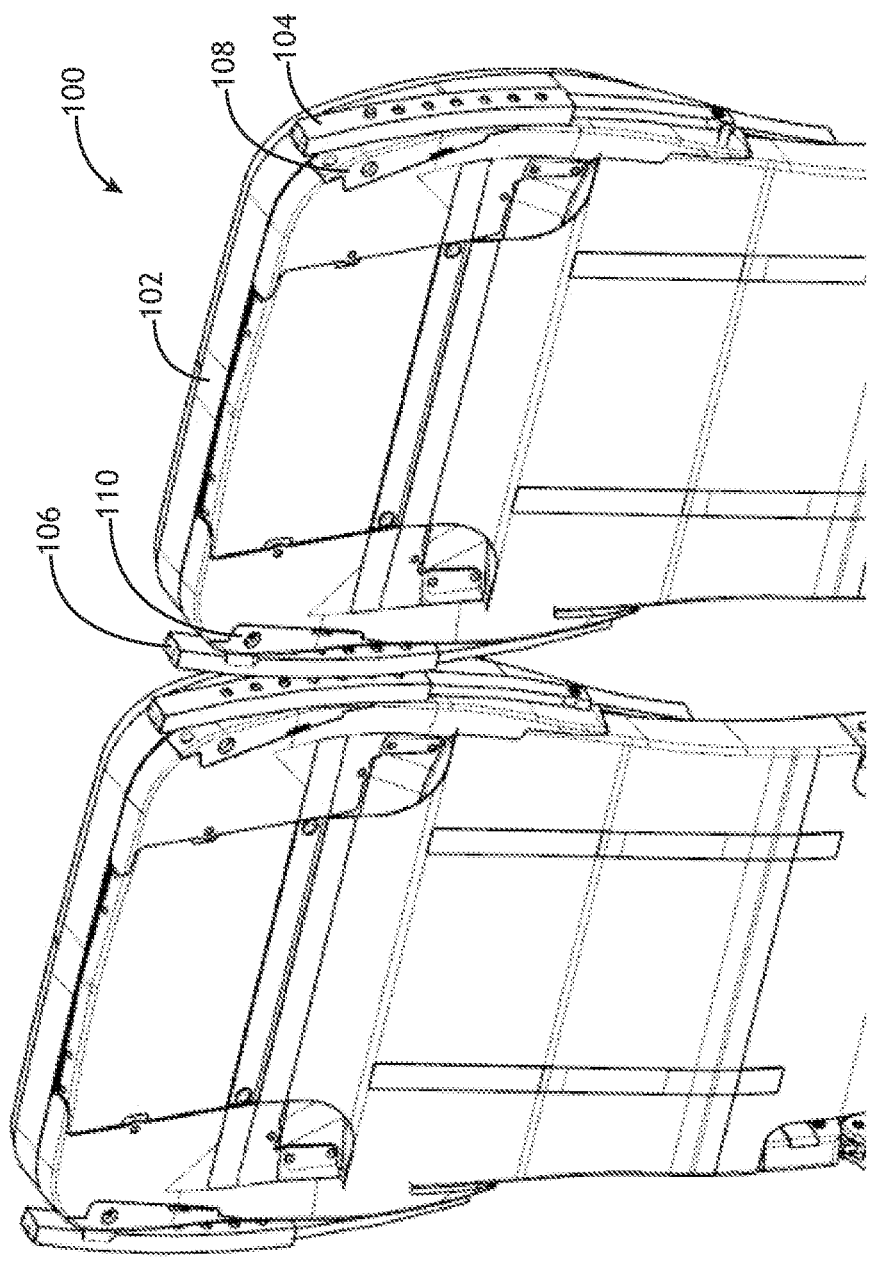
FIG. 1 is a front isometric view of passenger seat backrests showing sleep system support arms stowed.

Referring to FIG. 1, a non-limiting example of a passenger seat is shown generally at reference numeral 100. The seat 100 includes a backrest 102, also referred to herein as a "seat back," and typically further includes a seat bottom (not shown) and in some implementations at least one armrest (not shown). Seats 100 may be stand-alone or part of a seat row including at least two laterally adjacent seats. The sleep support system according to the present disclosure may be installed on the backrest 102 as original equipment or may be installable on the backrest as retrofit equipment. In the case of an aircraft passenger seat, the sleep support system is stowed during TTOL and may be selectively deployed during flight according to the desire of the seated passenger.

The sleep support system includes a first support arm 104 and a second support arm 106. The first support arm 104 is pivotally attached to or pivotally attachable to a first side of the backrest 102. The second support arm 106 is pivotally attached to or pivotally attachable to a second side of the backrest 102. As such, each support arm 104, 106 stows along its respective side of the backrest 102 between uses of the sleep support system. In some embodiments, the backrest 102 may be curved and each support arm 104, 106 may also be curved, for example with substantially corresponding curvatures, to provide compact stowage and clean aesthetics. Each support arm 104, 106 may be constructed from telescoping parts to permit height adjustment, wherein the telescoping parts lock relative to each other by way of a spring-loaded pin configuration.

Each of the first and second support arms 104, 106 is retained in its stowed condition by way of a retainer located on the backrest 102. As shown, a first retainer 108 functions to retain the first support arm 104 in the stowed condition and a second retainer 110 functions to retain the second support arm 106 in the stowed condition. The first and second support arms 104, 106 are independently retained and independently deployable. Each of the first and second retainers 108, 110 are positioned on their respective side of the backrest 102 and may include a rigid closeout.

Figure 2:
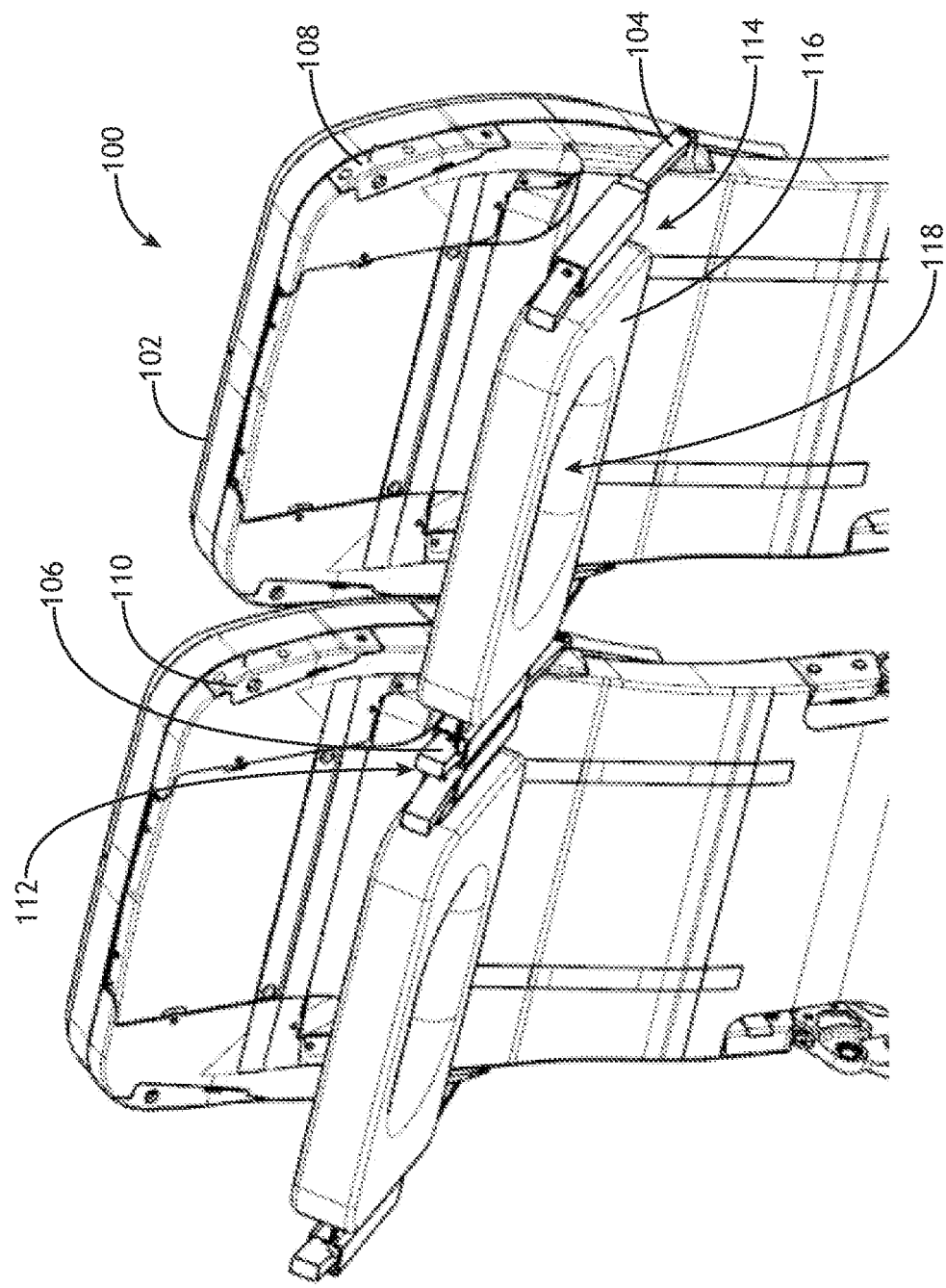
FIG. 2 is a front isometric view of the passenger seat backrests showing the support arms fully deployed and with a pillow assembly attached.

Referring to FIG. 2, the sleep support system deploys by releasing each of the first and second support arms 104, 106 and lowering the detached ends 112 of the support arms independently to deploy the support arms forward relative to the backrest 102. In their fully deployed position, each support arm 104, 106 is angled relative to the backrest 102 and to horizontal. The sleep support system further includes a pillow assembly 114 attachable to the deployed first and second support arms 104, 106. When installed, the pillow assembly 114 spans the distance between the deployed support arms generally centering a suspended pillow 116 between the support arms. The pillow 116 is positioned directly forward of the seated passenger, faces the seated passenger, and provides a bearing surface for the seated passenger to lean on. The pillow 116 may form a central opening 118. In use, the seated passenger may lean forward and place their head on the pillow 116 with their face positioned in the central opening 118. In use, the seated passenger may further grab and rest their arms on the first and second support arms 104, 106.

Figure 3:
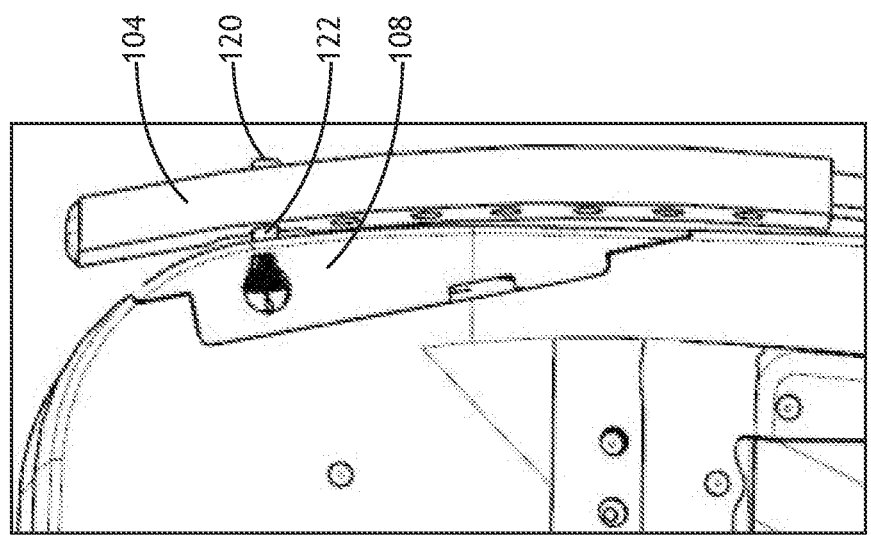
FIG. 3 is a detailed view showing the support arm pin locking feature.
Figure 4:
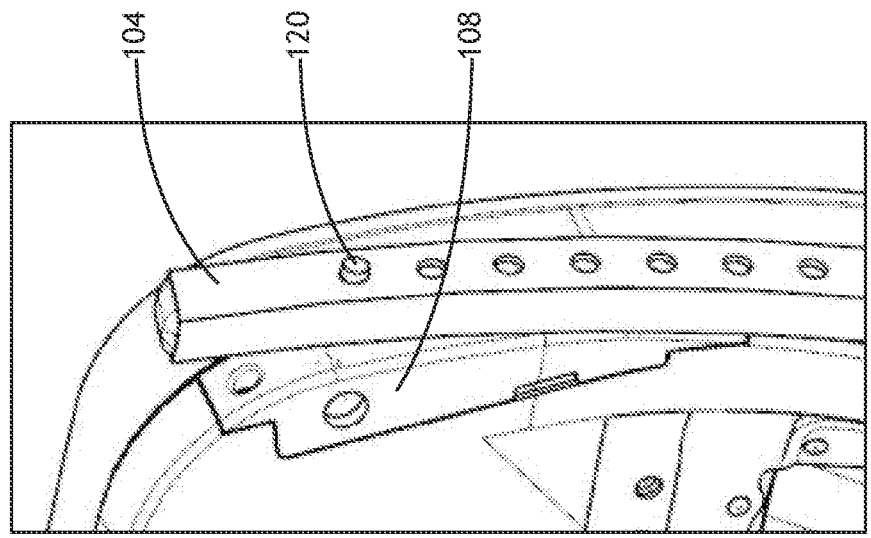
FIG. 4 is a detailed view showing the support arm push button release feature.

Referring to FIGS. 3 and 4, the sleep support system further includes a support arm release mechanism. In some embodiments, the first support arm 104 carries a first spring-loaded push button 120 and the first retainer 108 carries a first spring-loaded pin 122. Although not shown in FIG. 3, considering the symmetrical arrangement, the second support arm carries a second spring-loaded push button and the second side of the backrest carries a second spring-loaded pin. In the stowed condition of the first support arm 104, the first spring-loaded pin 122 is received in an opening formed in the first support arm such that the pin is axially aligned with the first spring-loaded push button 120. Likewise, in the stowed condition of the second support arm, the second spring-loaded pin is received in an opening formed in the second support arm such that the second pin is axially aligned with the second spring-loaded push button.

In use, to independently release the support arms, the first spring-loaded push button 120 is configured to be depressed to force the first spring-loaded pin 122 to withdraw from its respective opening formed in the first support arm 104 to deploy the first support arm forward. Likewise, the second spring-loaded push button is configured to be depressed to force the second spring-loaded pin to withdraw from its respective opening formed in the second support arm to deploy the second support arm forward.

Figure 5:
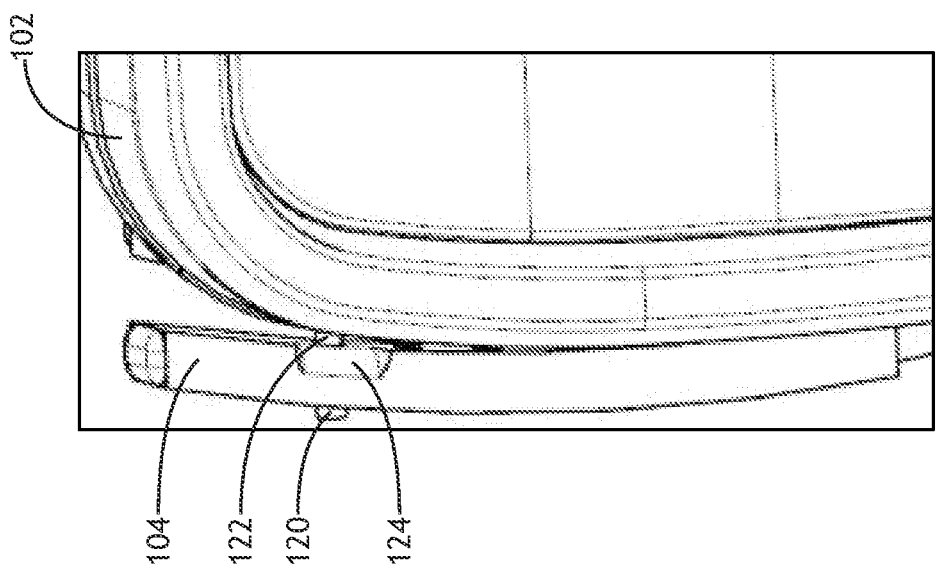
FIG. 5 is a detailed view showing the ramped arm feature for stowing the arm.

Referring to FIG. 5, the sleep support system further includes a return feature for assisting returning the deployed support arms to their stowed condition. As show, the first support arm 104 defines a ramped feature 124 formed on a back inboard side of the support arm vertically aligned with the first spring-loaded pin 122. In use, as the deployed first support arm 104 is moved toward its stowed condition the ramped surface 124 engages the first spring-loaded pin 122 thereby urging the first spring-loaded pin into the first retainer, i.e., toward the backrest 102. As the first arm 104 continues to move toward its stowed position, the ramped surface interacts with the first spring-loaded pin 122 to drive the pin further inward until the pin reaches the opening formed in the first support arm, at which time the spring action of the pin then drives the pin into the opening thereby retaining the first support arm in the stowed condition. Likewise, the same is true of the second support arm considering the symmetrical arrangement.

Figure 6:
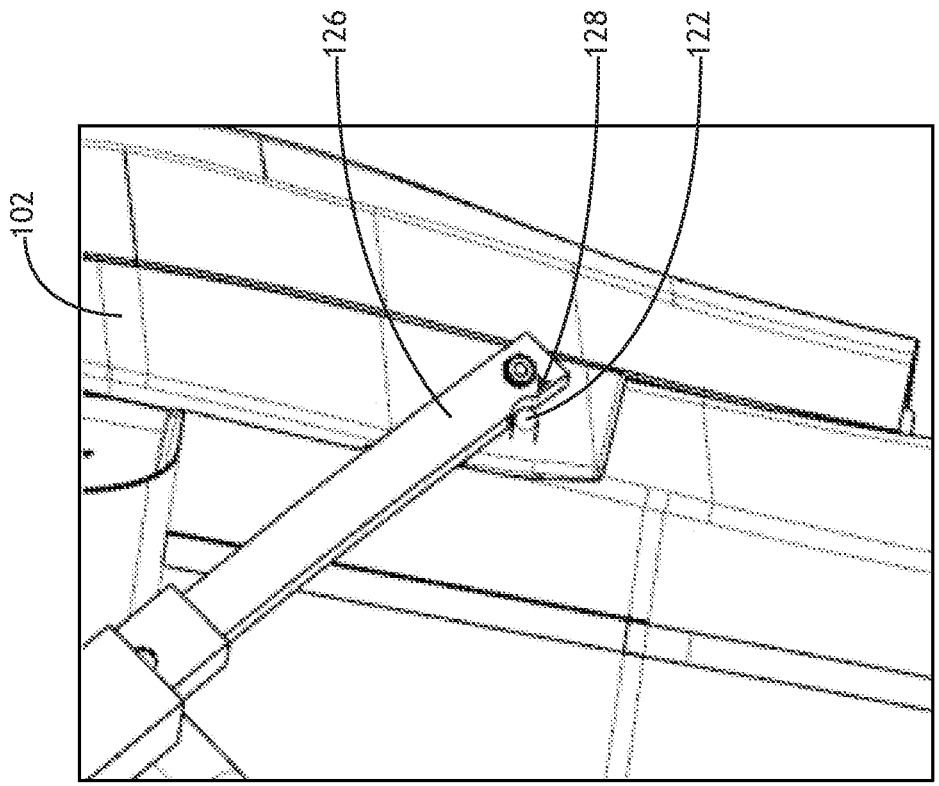
FIG. 6 is a detailed view showing the support arm stop feature.

Referring to FIG. 6, the sleep support system further includes a stop feature for preventing over travel of the first and second support arms. As shown, a stop pin 126 carried on the backrest, for instance carried on the first retainer 108, extends laterally outward from the side of the backrest. In use, the pivoting first support arm 104 pivots forward until the first support arm, proximal to its attached end, interacts with the stop pin 126 to stop forward deployment. In some embodiments, the first support arm 104 defines a recess 128 configured to locate the stop pin 126. Likewise, the same is true of the second support arm considering the symmetrical arrangement.

Figure 7:
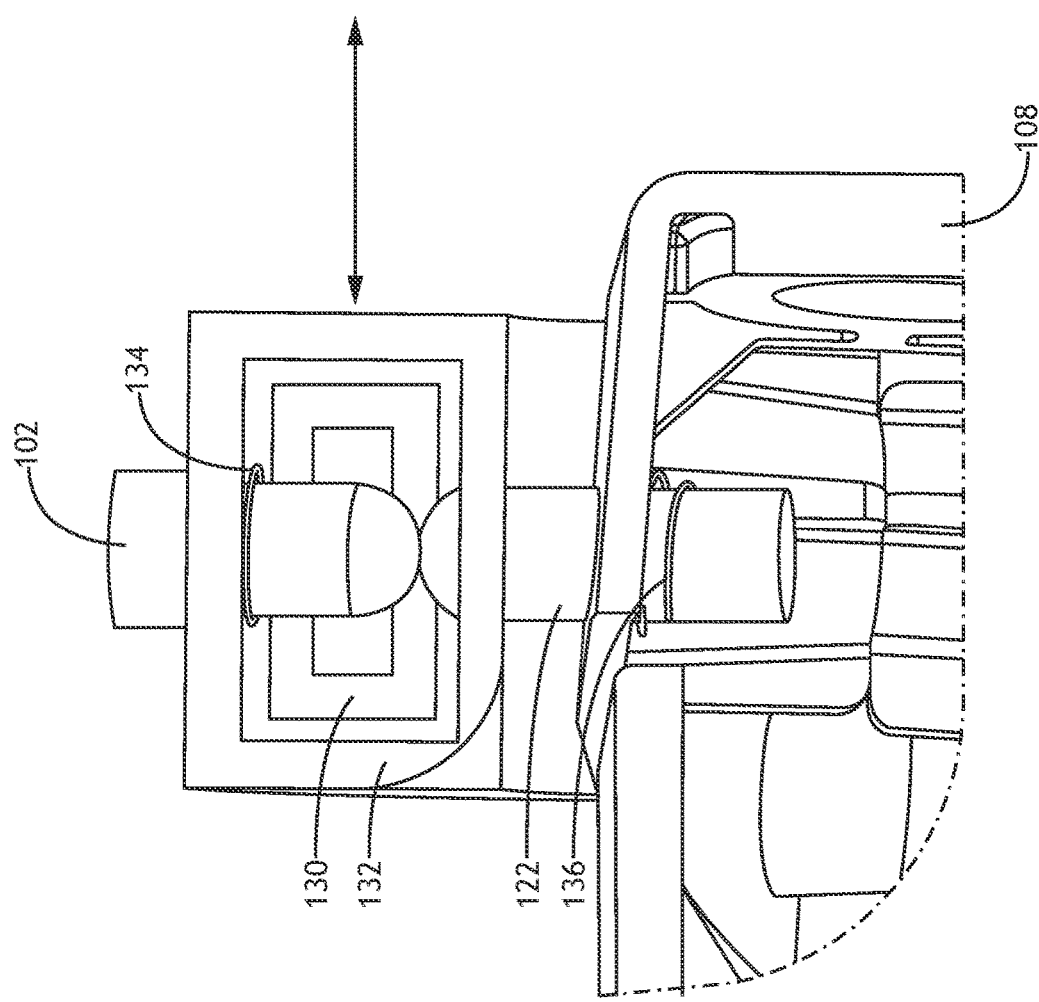
FIG. 7 is a sectional view showing the telescoping and pin release locking features.

Referring to FIG. 7, each of the first of the first and second support arms may include telescoping parts for length adjustment. As shown, the telescoping parts may include a first part 130 slidably engaged in a second part 132. In some embodiment, the first part 132 is the lower part of the support arm pivotally attached to the backrest and the second part is the upper part of the support arm removably attachable to the first retainer 108. A first biasing member 134, for instance a helical coil spring, positioned around the push button 120 operates to bias the push button outward away from the backrest. A second biasing member 136, for instance a helical coil spring, positioned around the pin 122 operates to bias the pin inward toward to the backrest. The spring-loaded push button 120 and the spring-loaded pin 122 are axially aligned, or substantially axially aligned, such that depressing the push button drives the pin inward thereby withdrawing the pin from the opening formed in the arm. Releasing the spring-loaded push button 120 returns the push button to its outwardly biased position.

Figure 9:
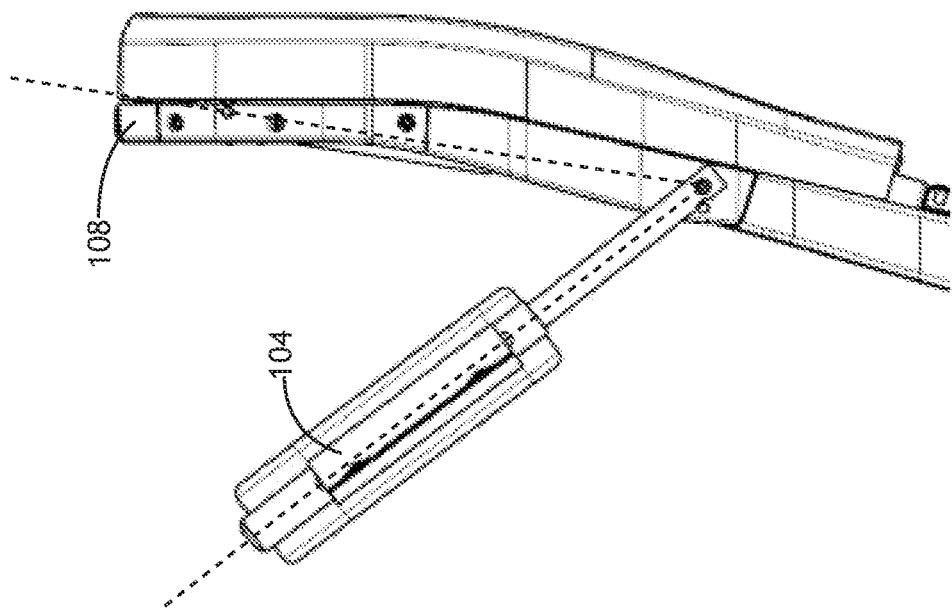
FIG. 9 is a side view of the passenger seat showing the angle of the fully deployed support arms.
Figure 8:
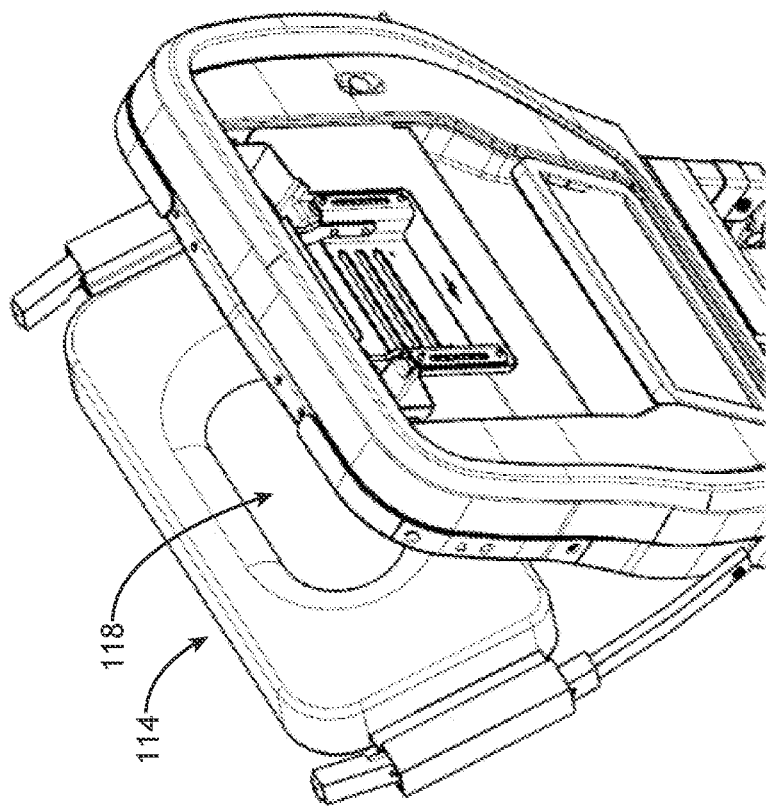
FIG. 8 is a rear isometric view of a passenger seat showing the support arms fully deployed and the pillow assembly installed.

Referring to FIG. 8, when fully deployed with the pillow assembly 114 installed, the sleep support system is positioned directly forward of the seated passenger ready to be leaned on, for instance with the passenger's face positioned in the central opening 118. Referring to FIG. 9, the first support arm 104 is movable between a stowed condition alongside the first retainer 108 and a deployed condition forward of the first retainer, wherein an angle formed between the stowed condition and the deployed condition of the first support arm is no more than 45 degrees. Likewise, the same is true of the second support arm.

Referring to FIGS. 10A and 10B, the pillow assembly 114 generally includes the central pillow 116 defining the central opening 118, a first sleeve 138, and a second sleeve 140. The first sleeve 138 is attached to one side of the pillow 116 and is configured to receive the first support arm, and the second sleeve 140 is attached to the opposing side of the pillow and is configured to receive the second support arm. When installed, the pillow assembly 114 spans between the first and second support arms and holds the pillow in a suspended condition. In some embodiments, each of the first and second sleeves 138, 140 are configured to open in order to wrap around their respective support arm to facilitate installation. As show, each sleeve may be equipped with fasteners 142, for instance snap fasteners, for securing the sleeve in a closed condition around the support arm. In alternative embodiments, the sleeves may be closed and the pillow assembly installed from above.

Figure 11:
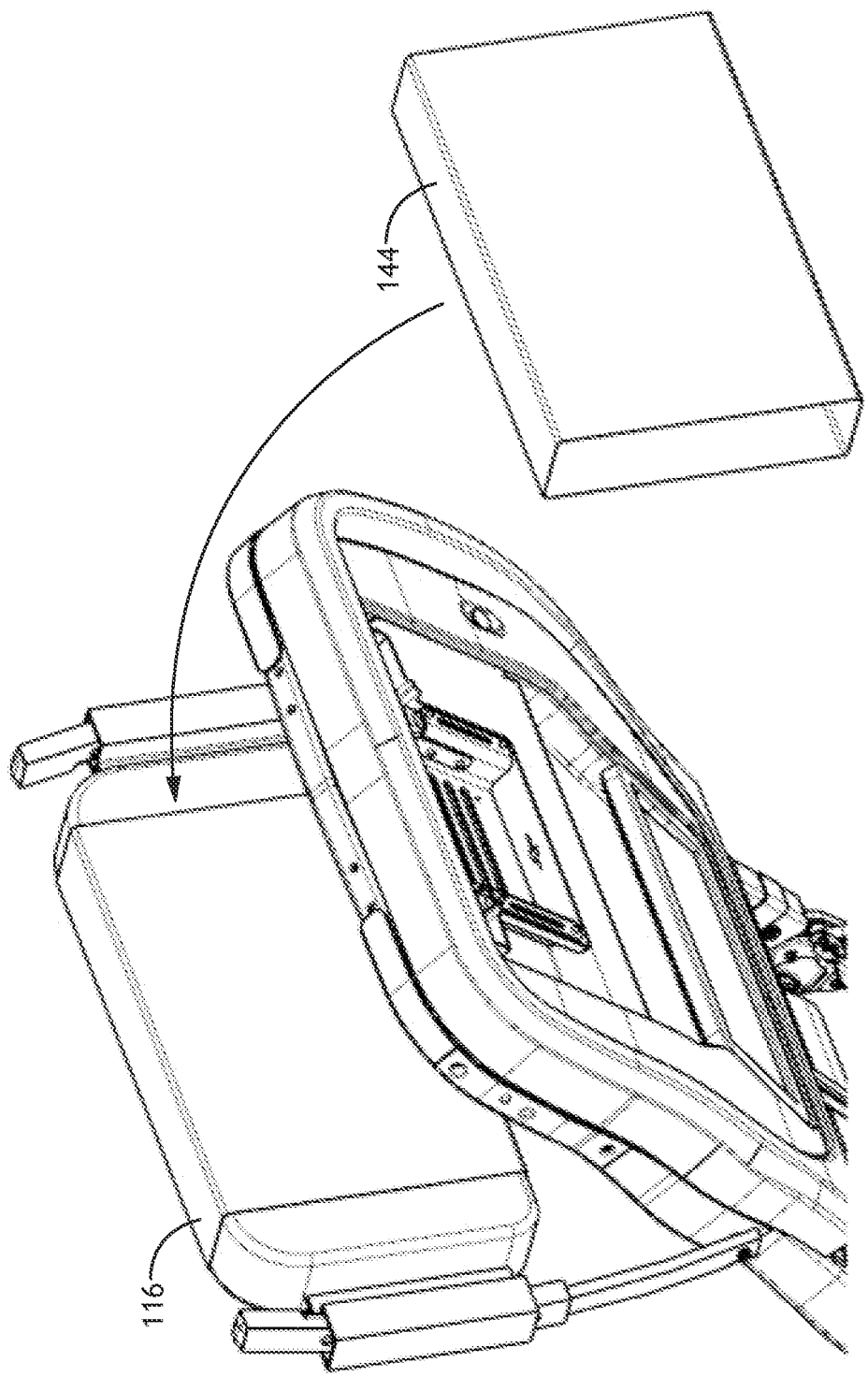
FIG. 11 is a perspective view showing sanitary cover installation.

Referring to FIG. 11, the sleep support system may further include a sanitary cover 144 configured to be installed over at least a portion of the cushion 116. The sanitary cover 144 may be changed between uses of the sleep support system for instance between flights. In some embodiments, the sanitary cover 144 is tubular to slide over the cushion before installing the cushion assembly on the support arms. In some embodiments, the cover 144 cover a portion of the cushion and the central opening.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:
1. An aircraft passenger seat, comprising:
a backrest; and a sleep support system attached to the backrest, the sleep support system comprising:
  a first support arm pivotally attached to a first side of the backrest, the first support arm having a detached end configured to be lowered to deploy the first support arm in a forward direction;
  a first retainer attached to the first side of the backrest configured to engage the first support arm to retain the first support arm in a stowed condition;
  a second support arm pivotally attached to a second side of the backrest, the second support arm having a detached end configured to be lowered to deploy the second support arm in a forward direction;
  a second retainer attached to the second side of the backrest configured to engage the second support arm to retain the second support arm in a stowed condition; and
  a pillow assembly attachable to the first and second support arms when the first and second support arms are deployed forward, the pillow assembly including a pillow having a center opening, a first sleeve attached to a first side of the pillow and configured to receive the first support arm, and a second sleeve attached to a second side of the pillow and configured to receive the second support arm.

2. The aircraft passenger seat according to claim 1, wherein the sleep support system further comprises a tubular cover configured to cover at least a portion of the pillow.

3. The aircraft passenger seat according to claim 1, wherein:
  the first support arm carries a first spring-loaded push button and the first retainer carries a first spring-loaded pin;
  the second support arm carries a second spring-loaded push button and the second retainer carries a second spring-loaded pin;
  in the stowed condition of the first support arm, the first spring-loaded pin is received in the first support arm axially aligned with the first spring-loaded push button;
  in the stowed condition of the second support arm, the second spring-loaded pin is received in the second support arm axially aligned with the second spring-loaded push button;
  the first spring-loaded push button is configured to be depressed to force the first spring-loaded pin to withdraw from the first support arm to deploy the first support arm forward; and
  the second spring-loaded push button is configured to be depressed to force the second spring-loaded pin to withdraw from the second support arm to deploy the second support arm forward.

4. The aircraft passenger seat according to claim 1, wherein:
  the first support arm defines a first ramped surface configured to drive the first spring-loaded pin into the first retainer upon engagement of the first ramped surface with the first spring-loaded pin; and
  the second support arm defines a second ramped surface configured to drive the second spring-loaded pin into the second retainer upon engagement of the second ramped surface with the second spring-loaded pin.

5. The aircraft passenger seat according to claim 1, further comprising a first stop pin carried on the first side of the backrest configured to interact with the first support arm to prevent over travel of the first support arm in the forward direction, and a second stop pin carried on the second side of the backrest configured to interact with the second support arm to prevent over travel of the second support arm in the forward direction.

6. The aircraft passenger seat according to claim 1, wherein each of the first support arm and the second support arm is curved and constructed from telescoping parts.

7. The aircraft passenger seat according to claim 1, wherein:
  the first sleeve is configured to wrap around the first support arm and includes fasteners for maintaining the first sleeve in a closed condition; and
  the second sleeve is configured to wrap around the second support arm and includes fasteners for maintaining the second sleeve in a closed condition.

8. The aircraft passenger seat according to claim 1, wherein:
  the first support arm is movable between a stowed condition alongside the first side of the backrest and a deployed condition forward of the backrest, and wherein an angle formed between the stowed condition and the deployed condition of the first support arm is no more than 45 degrees; and
  the second support arm is movable, independent of the first support arm, between a stowed condition alongside the second side of the backrest and a deployed condition forward of the backrest, and wherein an angle formed between the stowed condition and the deployed condition of the second support arm is no more than 45 degrees.

9. A sleep support system attachable to a passenger seat backrest, comprising:
  a first support arm pivotally attachable to a first side of the backrest, the first support arm having a detached end configured to be lowered to deploy the first support arm in a forward direction relative to the backrest;
  a first retainer attachable to the first side of the backrest configured to engage the first support arm to retain the first support arm in a stowed condition;
  a second support arm pivotally attachable to a second side of the backrest, the second support arm having a detached end configured to be lowered to deploy the second support arm in a forward direction relative to the backrest;
  a second retainer attachable to the second side of the backrest configured to engage the second support arm to retain the second support arm in a stowed condition;
  a pillow assembly attachable to the first and second support arms when the first and second support arms are deployed forward, the pillow assembly including a pillow having a center opening, a first sleeve attached to a first side of the pillow and configured to receive the first support arm, and a second sleeve attached to a second side of the pillow and configured to receive the second support arm; and
  a tubular cover configured to cover at least a portion of the pillow.

10. The sleep support system according to claim 9, wherein each of the first support arm and the second support arm comprises telescoping members.

11. The sleep support system according to claim 9, wherein:
  the first support arm carries a first spring-loaded push button and the first retainer carries a first spring-loaded pin;
  the second support arm carries a second spring-loaded push button and the second retainer carries a second spring-loaded pin;

in the stowed condition of the first support arm, the first spring-loaded pin is received in the first support arm axially aligned with the first spring-loaded push button;

in the stowed condition of the second support arm, the second spring-loaded pin is received in the second support arm axially aligned with the second spring-loaded push button;

the first spring-loaded push button is configured to be depressed to force the first spring-loaded pin to withdraw from the first support arm to deploy the first support arm forward; and the second spring-loaded push button is configured to be depressed to force the second spring-loaded pin to withdraw from the second support arm to deploy the second support arm forward.

12. The sleep support system according to claim 9, further comprising a first stop pin attachable to the first side of the backrest configured to interact with the first support arm to prevent over travel of the first support arm in the forward direction, and a second stop pin attachable to the second side of the backrest configured to interact with the second support arm to prevent over travel of the second support arm in the forward direction.

13. The sleep support system according to claim 9, wherein:

the first sleeve is configured to wrap around the first support arm and includes fasteners for maintaining the first sleeve in a closed condition;

the second sleeve is configured to wrap around the second support arm and includes fasteners for maintaining the second sleeve in a closed condition; and the pillow is elongate and the center opening is elongate.

14. The sleep support system according to claim 9, wherein:

the first support arm is movable between a stowed condition alongside the first retainer and a deployed condition forward of the first retainer, and wherein an angle formed between the stowed condition and the deployed condition of the first support arm is no more than 45 degrees; and the second support arm is movable, independent of the first support arm, between a stowed condition alongside the second retainer and a deployed condition forward of the second retainer, and wherein an angle formed between the stowed condition and the deployed condition of the second support arm is no more than 45 degrees.

15. The sleep support system according to claim 9, wherein each of the first arm and the second support arm is curved.

* * * * *